No. 876,942.
PATENTED JAN. 21, 1908.
W. R. CAMPBELL.
DRAFT EQUALIZER.
APPLICATION FILED JAN. 11, 1907.
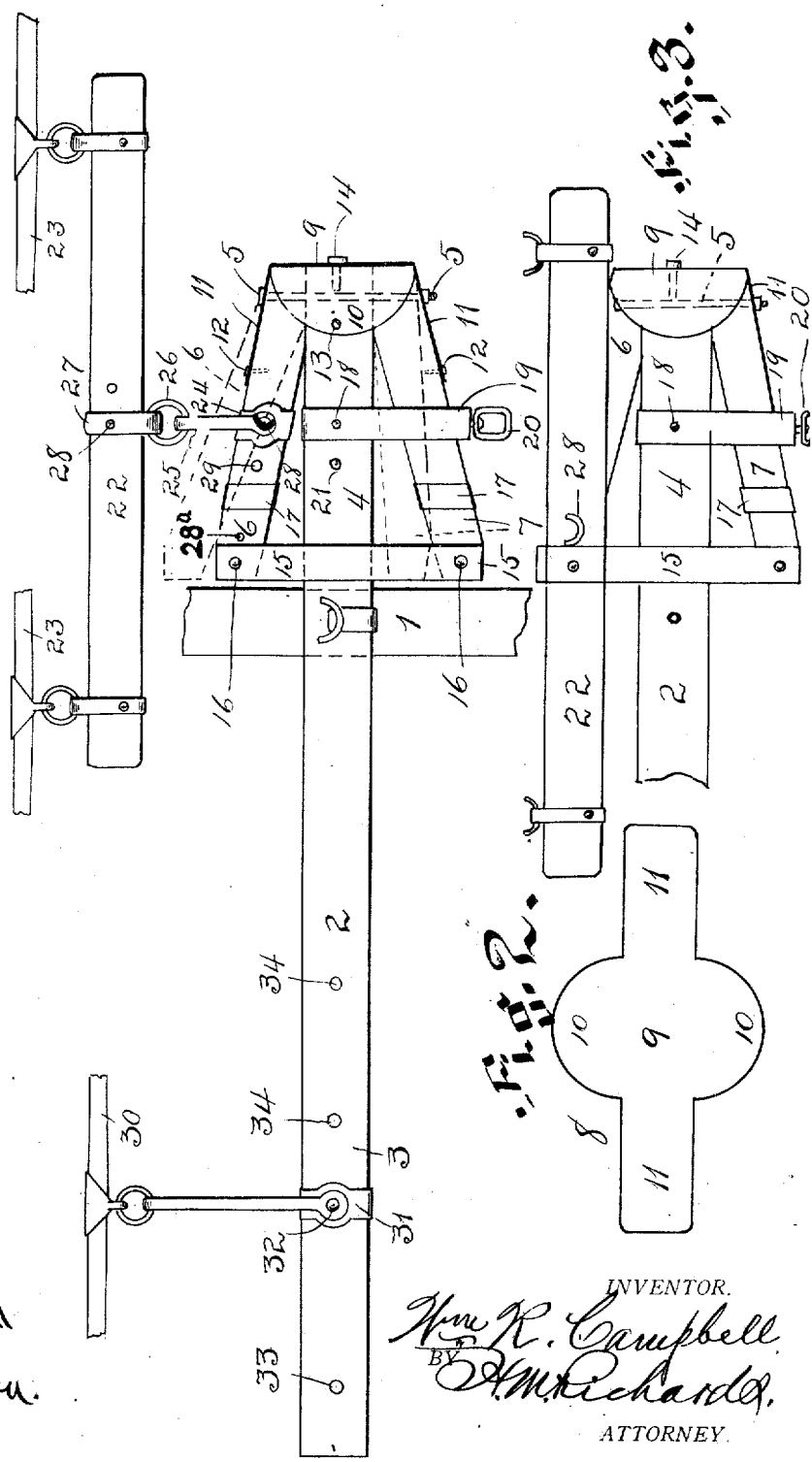
WITNESSES:
H. N. Brandall
J. M. Boston
INVENTOR.
Wm. R. Campbell
BY H. M. Richards
ATTORNEY.

UNITED STATES PATENT OFFICE.

WILLIAM R. CAMPBELL, OF LITTLE YORK, ILLINOIS.

DRAFT-EQUALIZER.

No. 876,942.　　Specification of Letters Patent.　　Patented Jan. 21, 1908.

Application filed January 11, 1907. Serial No. 351,758.

*To all whom it may concern:*

Be it known that I, WILLIAM R. CAMPBELL, a citizen of the United States, residing at Little York, in the county of Warren and State of Illinois, have invented a new and useful Draft-Equalizer, of which the following is a specification.

My present invention has relation to differential-draft appliances or equalizers, and to that particular type or class thereof which are shown in my co-pending application filed October 25th, 1906, Serial No. 340,562, and the main objects of the invention are to improve said type of equalizer by strengthening the same; by providing a differential draft appliance which is readily, quickly and easily changed from a right to a left hand device or vice versa; by providing a device of the character described in which the doubletree may be used either above or below the equalizer bar or the compensating arms; by providing interchangeable hitching and draft positions; by providing a closer hitch, and by prodining a device which is readily changed from a three to a four horse equalizer.

In carrying out these main objects of the invention improvements have been evolved which consist in novel structural features, novel organizations and novel combinations of parts, the separate and collective operations of which parts, their structural peculiarities, novel organizations and combinations are hereinafter fully described, shown in the drawings and made the subject matter of claims hereto appended.

In the accompanying drawings my improvements are embodied in the best way now known to me; obviously, however, some of the parts may differ, unessentially, in their construction, form and assemblage or disposition for co-action from what shown in said drawings, in which:

Figure 1 is a top plan embodying my invention, showing only so much of a vehicle tongue or draft pole as will illustrate its connection therewith; Fig. 2 is a plan of the blank from which the yoke is formed, and Fig. 3 a view similar to Fig. 1, the parts in different relative positions.

Like numerals designate the same parts in the different figures of the drawings, to which reference is now to be had and in which 1 represents the draft pole or tongue and 2 the main equalizing bar comprising a longer member 3 and a shorter member 4. Connected to the main bar near the end of the member 4 thereof are divergent or set-off compensating arms 6 and 7, the rear one of which is spaced at its free end a distance somewhat greater from the bar member 4 than its fellow. The outer ends of the bar and divergent arms are further held together by a yoke 8, preferably of resilient material, comprising a central portion 9 extending across the ends, a lateral semicircular clamp portion 10 above and below said ends, and elongated portions 11 extending alongside and fixed to the arms 6 and 7 by lag screws 12. A bolt 13 and lag screw 14 are preferably used where shown to hold them in proper positions, but the yoke is not so closely confined by them that the arms may not have slight movement laterally with relation to the bar, as shown by the dotted lines in the principal figure. A strap 15 surrounds and rigidly connects the inner ends of the arms 6 and 7 to which it is fixed by bolts or pins 16. To prevent splitting of the arms I employ on each a clip 17.

Centrally (at 18) of the shorter arm of the lever is fulcrumed a swing clevis 19 which passes therearound and about the arm 7 and is provided at its rear end with a swivel 20. The clevis and swivel are utilized when the equalizer is employed in connection with a plow or like implement not provided with a tongue, and it will be evident that when so used the tongue 1 (Fig. 1) is dispensed with and the doubletree moved over to the left, where it is attached to the inner end of the arm 6 by means of the clevis pin 28 (Fig. 3) being passed through the aperture 28ª (Fig. 1) in said arm. In the event of greater leverage being necessary, as often occurs when the strength of the draft animals is unequal, the clevis may be shifted to the opening 21.

The ordinary doubletree 22 provided with swingletrees 23 is attached in any well known manner to the bar 6, but preferably by the means shown comprising a clip 24, link 25, ring 26, strap 27 and bolt or clevis pin 28. Greater leverage being necessary, the pin 28 will be removed, the clip 24 slipped down to the opening 29 and said pin inserted therethrough.

30 is a swingletree attached to the arm 3 of the lever by the means shown, which are old and well known and need not be described.

In the event of more or less power being required to be exerted on this arm, the clip 31 and pin 32 are shifted to the openings 33 or 34 respectively as required.

8 represents the blank from which the yoke is formed. It is preferably of heavy resilient sheet metal capable of being bent into the contour shown at Figs. 1 and 3, but may however be cast in that form, in which case the arms 6 and 7 are allowed slight play therein.

In Fig. 3 I have shown a different manner of hitch whereby the draft animals are brought much closer to the machine than in the one shown at Fig. 1, a portion of the parts shown in the last figure not being utilized. In Fig. 3 the doubletree is brought back to the compensating arm 6 and the pin 28 passed through both, the strap 15 passing about them and the rear arm. The pin 28 is then shifted to an aperture to the inner side of the one used at Fig. 1. This hitch I employ when using more than three horses, the tongue being dispensed with and the tree 30 (which in this case is a doubletree,) is shifted in evident manner. By reversing the device it will be manifest that it is without any alteration changed from a right to a left hand equalizer. It will also be clear that the doubletree, when used as shown at Fig. 3, may be placed either above or below the arm 6. By changing it from where shown at Fig. 1 to the position at Fig. 3 it will be evident that the point of equalization becomes changed. It will be further evident that the device is not only capable of numerous changes as regards the leverage but that it may be used equally as well on plows and like devices not employing tongues as on vehicles provided with them. The resiliency or elasticity of the yoke 8 not only provides a yielding connection for the draft, but further furnishes an automatic lever adjustment, inasmuch as by reason of said resiliency the tendency of the offset arms is to adjust themselves at all times to the constantly changing or varying conditions of the draft. By bringing the doubletree back to rest on top of the forward off-set arm, not only are the clip 24, link 25, ring 26 and strap 27 dispensed with, but a much closer hitch or mode of attachment to the wagon or implement being drawn is had than heretofore or in the method shown in Fig. 1, wherein a tongue is used, and the great benefits to be derived from this closer hitch will be understood by those skilled in the art of plowing.

Having described my invention I claim as new and desire to secure by Letters Patent the following, namely:

1. In an equalizer, a main bar having unequal arms, a compensating set-off arm connected to the outer portion of the shorter arm of the bar forwardly thereof, means for attaching draft animals thereto, a similar arm connected to the same arm of the bar rearwardly thereof, and a clevis pivoted to the main bar and adapted for engagement with a vehicle.

2. In an equalizer, a main bar having unequal arms, a compensating set-off arm connected to the outer portion of the shorter arm of the bar forwardly thereof, means for attaching draft animals thereto, a similar arm connected to the same arm of the bar rearwardly thereof, a strap fixedly connecting the inner ends of the set-off arms, a clevis pivoted to the main bar and extending rearwardly therefrom, a spring yoke to which the ends of the set-off arms and the main bar are secured, the ends thereof extending a distance alongside the outer portions of the arms.

3. In an equalizer, a main bar having unequal arms, a compensating set-off arm connected to the outer portion of the shorter arm of the bar forwardly thereof, means for attaching draft animals thereto, a similar arm connected to the same arm of the bar rearwardly thereof, a clevis pivoted to the main bar and extending in rear of the rear compensating arm, a strap connecting the inner ends of the set-off arms, a doubletree, and means whereby it may be pivotally connected to either the forward set-off arm or to the main bar.

4. In a device of the character described, a single equalizing bar comprising longer and shorter members, a swinging clevis pivoted on the last named member, and compensating set-off arms secured to said shorter member and adapted to have vibratory movement transversely thereof.

5. In a device of the character described, a single equalizing bar comprising longer and shorter members, a swinging clevis pivoted on the last named member, apertures in said bar whereby the clevis may be adjusted longitudinally thereof, and compensating set-off arms secured to said member laterally thereof and adapted to have vibratory movement transversely thereof.

6. In a device of the class described, a single equalizing bar comprising longer and shorter members, a swinging clevis pivoted on the last named member, set-off compensating arms laterally of said member, and a yoke surrounding and uniting said member and arms at their outer ends.

7. In a device of the character described, a single equalizing bar comprising longer and shorter members, a swinging clevis pivoted to the last named member, set-off compensating arms laterally of said member, a yoke surrounding and connecting their outer ends, their inner ends spaced a distance from said bar, and means for rigidly connecting them.

8. In a device of the character described, a single equalizing bar comprising longer and shorter members, a swinging clevis pivoted to the last named member, set-off compensating arms laterally of said member, a yoke surrounding and connecting their outer ends, their inner ends spaced a distance from said bar, and a cord or strap for rigidly connecting them.

9. In combination, an equalizer bar, compensating arms laterally thereof, means for connecting said bar and arms whereby the latter may have vibratory movement with reference to the former, and a swinging clevis fulcrumed on said bar and extending beyond the rear one of said arms.

10. In combination, an equalizing bar, compensating set-off arms laterally thereof, their inner ends spaced unequidistant from said bar, means for rigidly connecting said ends, means for uniting their outer ends and the outer end of said bar whereby the former may have vibratory movement with reference to the latter, and a swinging clevis pivoted to said bar between said arms and extending in rear of one thereof.

11. The combination in a device of the character described of a single equalizer bar comprising longer and shorter members, a swinging clevis pivoted on the last named member, set-off compensating arms laterally of said member, a yoke extending around, above and below the outer ends of said bar and arms, and means for securing said last named elements together in such manner that said arms may vibrate with relation to the bar.

12. The combination in a device of the nature described, of an equalizer bar comprising longer and shorter members, a swinging clevis pivoted on the last named member, set-off compensating arms laterally thereof, means for connecting their forward or inner ends, a yoke uniting the outer ends of the bar and arms, and means for securing said ends in such manner that the arms may oscillate with reference to the bar.

13. The combination in a device of the nature described, of an equalizer bar comprising longer and shorter members, a swing clevis pivoted to the last named member, set-off compensating arms laterally thereof, a doubletree adjustably and pivotally connected to the forward set off arm, and a swingletree similarly connected to the longer arm of the bar.

14. In combination, an equalizer bar, a swinging clevis pivoted thereon unequidistant from its ends, and divergent compensating arms engaged with said bar to vibrate with reference thereto.

15. In combination, an equalizing bar, a swinging clevis pivoted thereon, divergent compensating arms engaged with said bar to vibrate with reference thereto, a yoke uniting said bar and arms at their outer ends, means for rigidly connecting the inner ends of the arms, a doubletree adapted to be pivotally connected with the short end of the bar or to the forward compensating arm and a swingletree connected with the longer end of said bar.

16. The combination of an equalizing bar, divergent compensating arms, a yoke positioned above, below and around the ends of the bar and arms, a bolt passing transversely through said elements, and means for holding the bar in rectangular relation to the yoke but permitting oscillating movement of the arms with reference thereto.

In witness that I claim the foregoing I hereto subscribe my name in presence of two witnesses.

WILLIAM R. CAMPBELL.

Witnesses:
S. L. THOMSON,
J. C. WALLACE.

Correction in Letters Patent No. 876,942.

It is hereby certified that in Letters Patent No. 876,942, granted January 21, 1908, upon the application of William R. Campbell, of Little York, Illinois, for an improvement in "Draft-Equalizers," an error appears in the printed specification requiring correction, as follows: In line 24, page 1, the word "prodiuing" should be *providing;* and that the said Letters Patent should be read with this correction therein that the same may conform to the record of the case in the Patent Office.

Signed and sealed this 25th day of February, A. D., 1908.

[SEAL.]

C. C. BILLINGS,
*Acting Commissioner of Patents.*